United States Patent
Ben-Yehezkel et al.

[11] Patent Number: 6,049,711
[45] Date of Patent: *Apr. 11, 2000

[54] METHOD AND APPARATUS FOR PROVIDING LOCATION-BASED INFORMATION SERVICES

[75] Inventors: Doron Ben-Yehezkel, Los Angeles; James E. Forman, Westchester; John A. Baker, Playa del Rey, all of Calif.

[73] Assignee: Teletrac, Inc., Carslbad, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/518,141

[22] Filed: Aug. 23, 1995

[51] Int. Cl.[7] ............................................. H04Q 7/22
[52] U.S. Cl. ................................. 455/414; 455/456
[58] Field of Search ................................. 455/403, 414, 455/418, 419, 420, 456, 458

[56] References Cited

U.S. PATENT DOCUMENTS

| | | |
|---|---|---|
| 4,503,288 | 3/1985 | Kessler . |
| 4,577,062 | 3/1986 | Hilleary . |
| 4,663,629 | 5/1987 | Tagami . |
| 4,748,655 | 5/1988 | Thrower . |
| 4,775,997 | 10/1988 | West, Jr. . |
| 4,812,843 | 3/1989 | Champion, III . |
| 4,912,645 | 3/1990 | Kakihara . |
| 4,932,022 | 6/1990 | Keeney . |
| 4,972,457 | 11/1990 | O'Sullivan . |
| 5,055,851 | 10/1991 | Sheffer ............................. 455/456 |
| 5,127,041 | 6/1992 | O'Sullivan . |
| 5,131,020 | 7/1992 | Liebesny .......................... 455/414 |
| 5,159,556 | 10/1992 | Schorter . |
| 5,172,321 | 12/1992 | Ghaem et al. .................... 364/444 |
| 5,173,691 | 12/1992 | Sumner . |
| 5,182,555 | 1/1993 | Sumner . |
| 5,187,810 | 2/1993 | Yoneyama . |
| 5,201,067 | 4/1993 | Grube ............................... 455/420 |
| 5,208,756 | 5/1993 | Song ................................. 455/456 |
| 5,218,618 | 6/1993 | Sagey . |
| 5,237,602 | 8/1993 | Lazik ............................... 455/420 |
| 5,276,909 | 1/1994 | Milner et al. .................... 455/38.5 |
| 5,293,645 | 3/1994 | Soon ................................. 455/456 |

(List continued on next page.)

FOREIGN PATENT DOCUMENTS 9408403  4/1994  WIPO .

OTHER PUBLICATIONS

Television broadcast of "Fight Back with David Horowitz" on KNBC, Burbank, California during the approximate time period of 1990–1991.

*Primary Examiner*—Dwayne D. Bost
*Assistant Examiner*—Myron K. Wyche
*Attorney, Agent, or Firm*—Roylance, Abrams, Berdo & Goodman, L.L.P.

[57] ABSTRACT

A method and system for providing location-based information services to a requesting user. A subscriber unit transmits an access request message comprising an identification number to one or more receiving sites on a response channel. A forward channel message is sent to the subscriber unit, the forward channel message comprising the identification number of the subscriber unit and data defining the time slot for transmission of a response message. A response message comprising an information service request and a location signal is transmitted from the subscriber unit and received at at least three receiving sites during the time interval identified by the forward channel message. The time difference of arrival of the location signal is used to determine the location of the subscriber unit. Thereafter, an information service message is generated which is responsive to the information service request and the location of the subscriber unit and transmitted to the subscriber unit on the forward channel. The step of generating the information service message comprises the steps of creating a database request from the information service request and the subscriber unit location, receiving database information response to the database request and the subscriber unit location, and processing and combining the database information to produce an information service message.

17 Claims, 11 Drawing Sheets

U.S. PATENT DOCUMENTS

| | | | |
|---|---|---|---|
| 5,297,189 | 3/1994 | Chabernaud | 455/414 |
| 5,321,737 | 6/1994 | Patsiokas . | |
| 5,343,493 | 8/1994 | Karimullah . | |
| 5,365,451 | 11/1994 | Wang et al. | 364/449 |
| 5,365,516 | 11/1994 | Jandrell . | |
| 5,379,451 | 1/1995 | Nakagoshi | 455/456 |
| 5,396,540 | 3/1995 | Gooch | 379/59 |
| 5,400,392 | 3/1995 | Nagashima | 455/456 |
| 5,414,750 | 5/1995 | Bhagat | 455/414 |
| 5,428,665 | 6/1995 | Lantto | 455/414 |
| 5,457,732 | 10/1995 | Goldberg | 455/419 |
| 5,485,505 | 1/1996 | Norman | 455/419 |
| 5,490,200 | 2/1996 | Snyder | 455/420 |
| 5,495,519 | 2/1996 | Chen | 455/420 |
| 5,502,757 | 3/1996 | Bales | 455/414 |
| 5,513,244 | 4/1996 | Joao | 455/420 |
| 5,515,419 | 5/1996 | Sheffer | 455/456 |
| 5,542,100 | 7/1996 | Hatakeyama | 455/456 |
| 5,572,204 | 11/1996 | Timm | 455/456 |
| 5,577,103 | 11/1996 | Fot | 455/414 |
| 5,579,535 | 11/1996 | Orlen | 455/456 |
| 5,594,776 | 1/1997 | Dent | 455/458 |
| 5,594,779 | 1/1997 | Goodman | 455/414 |
| 5,625,884 | 4/1997 | Gitlin | 455/458 |
| 5,629,693 | 5/1997 | Janky | 455/456 |
| 5,630,206 | 5/1997 | Urban | 455/456 |

METHOD AND APPARATUS FOR PROVIDING LOCATION-BASED INFORMATION SERVICES

BACKGROUND OF THE INVENTION

1. Field of the Invention

The present invention relates generally to providing information services and in particular to a method and apparatus for providing integrated location-based information services from a plurality of sources to a remote mobile subscriber unit.

2. Description of the Related Art

In an age of ever-expanding information resources, such resources provide useful and potentially vital information for reliable and accurate decision making. At the same time, society is increasingly mobile, with people spending more and more time traveling to and from their offices, homes, and other destinations, usually in their automobiles or other forms of transportation.

A plethora of information resources and increasing mobility presents some unique problems in providing information services. When mobile, access to important information services may be effectively cut off, often when the information is needed most. Also, the information provided is often location-sensitive, that is, dependent upon the location of the requester or the subject of the request. In such instances, the location of the requester or subject must be determined, or the effectiveness of the information provided may be limited. For example, a person driving in a car may be lost and want directions to the nearest open gasoline station. If the location of the requester is unknown, step-by-step directions cannot be provided. Also, if the distance between the gas station and the requestor is unknown, the system may direct the person to a gas station which closed before the person arrives.

Further, an information request often requires access to data from a number of independent and sometimes conflicting sources for the same information. When this occurs, the information service provider must pre-process the information before providing it to the requestor, or the requestor will be confronted with conflicting and contradictory information. This problem is especially onerous for mobile requesters, because the requester may be simultaneously operating an automobile and unable to examine and resolve conflicts in the information. While these conflicting mobile information sources may be resolved and fused at a central location or at the mobile unit, the mobile units cannot easily perform the task because they typically do not have the necessary processing, storage, or data capabilities. Further, providing all relevant data sources to the mobile unit is infeasible, since this would unduly load the communication channels between the service provider and the mobile units.

Fusing information at a central location is also not without its difficulties, requiring human intervention, or requiring excessive processing power and memory. Further this problem intensifies as the number, scope and size of each of the information service databases grows, as they inevitably do over time.

The system disclosed in U.S. Pat. No. 4,812,843, issued Mar. 14, 1989 to Champion et al., discloses providing information to mobile users, but does not customize this information to the requestor's measured location. Champion also cannot provide step-by-step directions to someone who does not know their location or provide location-based information or generate commands regarding another mobile user.

The system disclosed in U.S. Pat. No. 5,343,493, issued Aug. 30, 1994 to Karimullah, discloses determining the location of the requester using multilateration, but relies on a cellular phone link to deliver the information. The system disclosed measures the location of the requester, but only to select the cellular telephone network site that is used to deliver the information, not to customize the information delivered or to supply fused data. Also, Karimullah does not disclose providing location-based commands.

The system disclosed in U.S. Pat. No. 5,365,516, issued Nov. 15, 1994 to Jandrell, discloses using a paging response channel to provide information and obtaining the location of a mobile unit by multilateration, but does not disclose providing information services customized to the requestor's location or the subject of the request.

Accordingly, there is a need for providing location-sensitive information services to mobile users that require access to multiple and potentially conflicting sources of data. The present invention provides fused location-based information services by using the measured location of the requesting unit and the subject of the request to identify the data of interest. In doing so, irrelevant conflicts are avoided, greatly simplifying the process.

There also exists a need to send commands to or obtain information from subscribers which are customized to conform to their measured location. For example, an ambulance dispatcher may want to send a request for status or provide commands to ambulances within a radius of one mile of a reported accident. Or, similarly, a parent may want to send a message to their child to return home, but only if they are not already within a 10 mile radius or in motion towards home. The present invention fulfills this need by providing location-based information and command services from multiple information sources.

SUMMARY OF THE INVENTION

To overcome the limitations in the prior art described above, and to overcome other limitations that will become apparent upon reading and understanding the present specification, the present invention discloses a method of providing location-based information to a requesting user.

The method of the present invention comprises the steps of transmitting an access request message having the identification number of a subscriber unit from the subscriber unit to one or more receive sites on a response channel; in response to the access request message, transmitting a forward channel message from a transmitting site to the subscriber unit on a forward channel, the forward channel message having an identification number of the subscriber unit and data defining a time slot for transmission of a response message; transmitting a response message comprising an information service request and a location signal from the subscriber unit to at least three receiving sites in the defined time slot; locating the subscriber unit from the time difference of arrival of the location signal at the receiving sites; generating an information service message in response to the information service request; and transmitting the information service message to the subscriber unit on the forward channel. The step of generating an information service message comprises creating a database request from the information service request and the subscriber unit location, receiving database information responsive to the database request, and producing an information service message using the database information.

The present invention may also be practiced by requesting access to information services via an existing communication system, such as the Public Switched Telephone Network, or a wireless network. In addition, using the present invention, subscribing users can request and obtain information regarding other subscriber units, including their location. The present invention further allows commands and data to be provided to a subscriber unit from another subscriber unit or by using an existing communication system, or data to be read from devices coupled to the subscriber unit. To control access to information services, the present invention also includes the step of verifying that the requesting user is authorized access to the information services. Provisions are also made for keeping records of requesting users and the information requests for billing or other purposes.

BRIEF DESCRIPTION OF THE DRAWINGS

Referring now to the drawings in which like reference numerals represent corresponding parts thereof.

DETAILED DESCRIPTION OF THE PREFERRED EMBODIMENT

Figure 1:
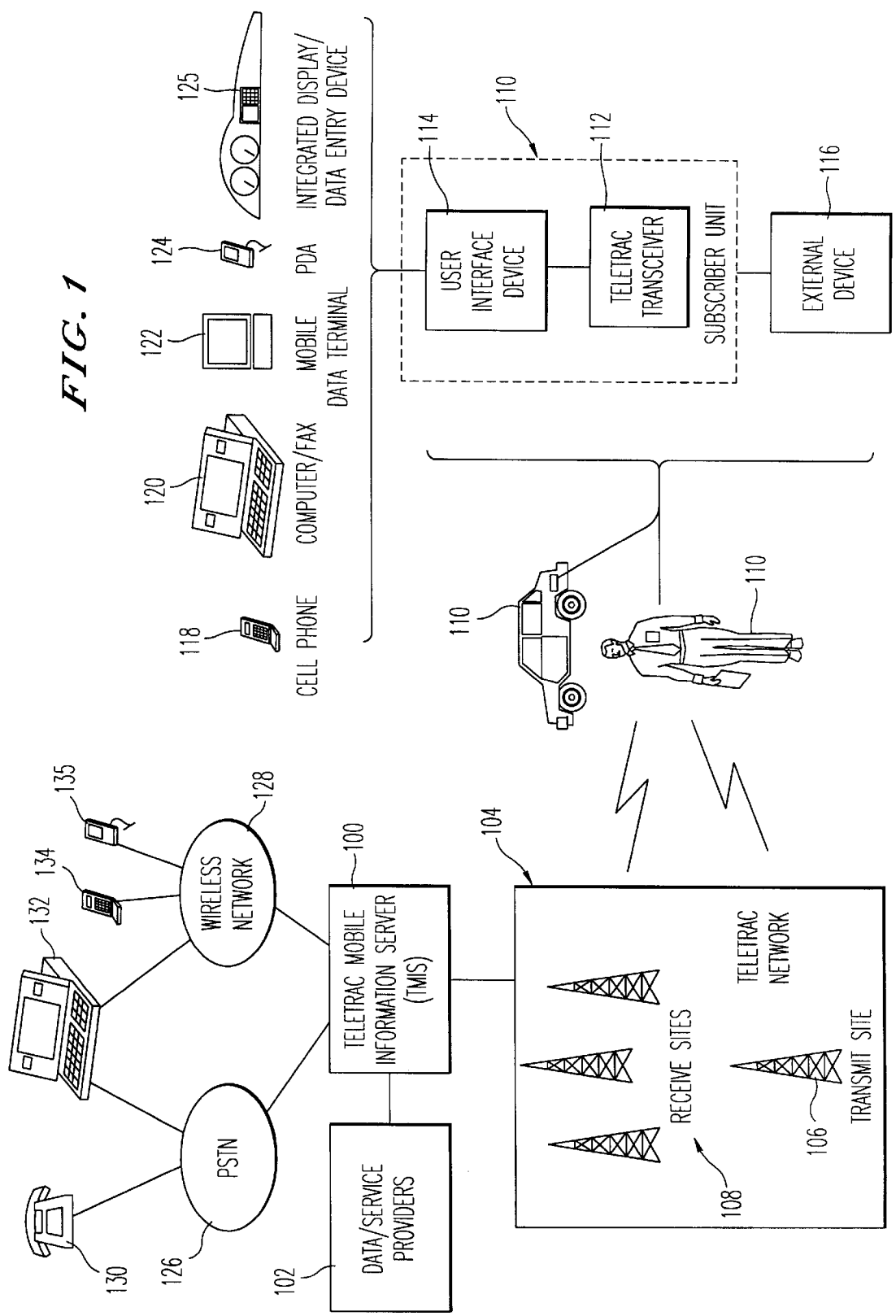
FIG. 1 shows one possible embodiment of the system components according to the present invention.

In the following description of the preferred embodiment, reference is made to the accompanying drawings which form a part hereof, and in which is shown by way of illustration, a specific embodiment in which the invention may be practiced. It is to be understood that other embodiments may be used and changes may be made without departing from the scope of the present invention.

OVERVIEW

The present invention provides location-based information services to mobile users with subscriber units, using a TELETRAC™ Mobile Information Server (TMIS). The present invention also uses existing commercial technologies to provide a broad range of information services. These technologies include the TELETRAC™ Location and Messaging Network, the Public Switched Telephone Network (PSTN) and wireless communication networks. The services that may be provided to the user using the present invention include traffic reports, "piece of mind" location information, electronic Yellow Pages, point-to-point routing and re-routing, personal two-way messaging including acknowledged paging, and emergency services such as roadside assistance, stolen vehicle recovery, medical alert, and requests for police assistance. Since the invention uses a TELETRAC™ transceiver and a TELETRAC™ network, the location of the transceiver is automatically computed and available if the service provided requires it.

For example, with regard to traffic reports, the user can request a customized traffic report for the area around the vehicle and in the direction of travel along a prespecified route or for a specific highway. The user can request the closest point of interest from the current location of the vehicle or obtain a list of points of interest in a specific radius of the vehicle's present location. Points of interest stored in a destination database are organized into categories and sub-categories. For example, category—restaurants, sub-category—Italian; or category—banks, sub-category—"Downtown Savings", sub-sub-category—ATM (Automatic Teller Machine), sub-sub-sub-category—cash. The user may select a category or sub-category and then request the closest location, or alternatively for a list of locations within a specified radius and direction. With regard to routing instructions, the user can request routing instructions from the present location of the vehicle, computed automatically by the TELETRAC™ system, to a destination selected from a list or resulting from a Yellow Pages look-up. With regard to emergency services, the user may request services and receive acknowledgements using the TELETRAC™ transceiver and a number of user interface devices. This service also can be provided based on the location of the requesting user.

The system can also be used to send and receive messages within a vehicle and can also be used to command a device coupled to the subscriber unit as described herein. Finally, information services can also be provided to individuals who are not in possession of a subscriber unit. This is accomplished by providing external access to the TMIS via the PSTN or other communication system including wireless services. Once authenticated via a specific account number and password, a non-subscribing user can access TMIS and obtain information regarding the location or status of a subscriber unit, or provide data and send commands to a device coupled to the subscriber unit.

SYSTEM COMPONENTS

FIG. 1 shows one possible embodiment of the system components according to the present invention. The system provides location based information services to a plurality of subscriber units and comprises a TELETRAC™ Mobile Information Server (TMIS) 100 coupled to one or more data service providers 102. The TMIS 100 is also coupled to a TELETRAC™ network 104 that is comprised of at least one transmit site 106 and at least three receive sites 108 for communicating with a subscriber unit 110, which may be located in an automobile or on the person.

The subscriber unit 110 comprises a TELETRAC™ transceiver 112 coupled to a user interface device 114. The user interface device 114 may alternatively or in combination be an external device 116, a cellular phone 118, a computer 120, a mobile data terminal 122, a personal data assistant (PDA) 124, or an integrated display/data entry device 125. The integrated display/data entry device 125 could be integrated into an automobile console and/or integrated with other automotive instrumentation or accessories. The user interface device 114 provides the function of inputting commands to the TELETRAC™ transceiver 112 and presenting data received by the TELETRAC™ transceiver 112 to the user.

When the subscriber unit 110 is coupled to an external device 116, the subscriber unit 110 can supply commands and receive data from the external device 116. For example, the subscriber unit may be coupled to an external device which is capable of opening or closing the automatic door locks in an automobile, or starting or stopping the automobile ignition system. Similarly, the subscriber unit 110 may be coupled to a measurement device providing information regarding the operational characteristics of the automobile.

Messages are transmitted between the subscriber unit 110 and the TMIS 100 using the TELETRAC™ network 104. Also coupled to the TMIS 100 are the public switched telephone network (PSTN) 126 and other wireless communications network 128, which in one embodiment is a cellular telephone network. Both the PSTN 126 and the wireless network 128 are alternatively or collectively coupled to external interface devices, including a telephone external interface 130, a computer/fax external interface 132, and a cellular telephone external interface 134, and a personal data assistant (PDA) external interface 135, thereby providing access to TMIS 100 to persons not in possession of a subscriber unit 110 or to non-subscribers.

Figure 2:
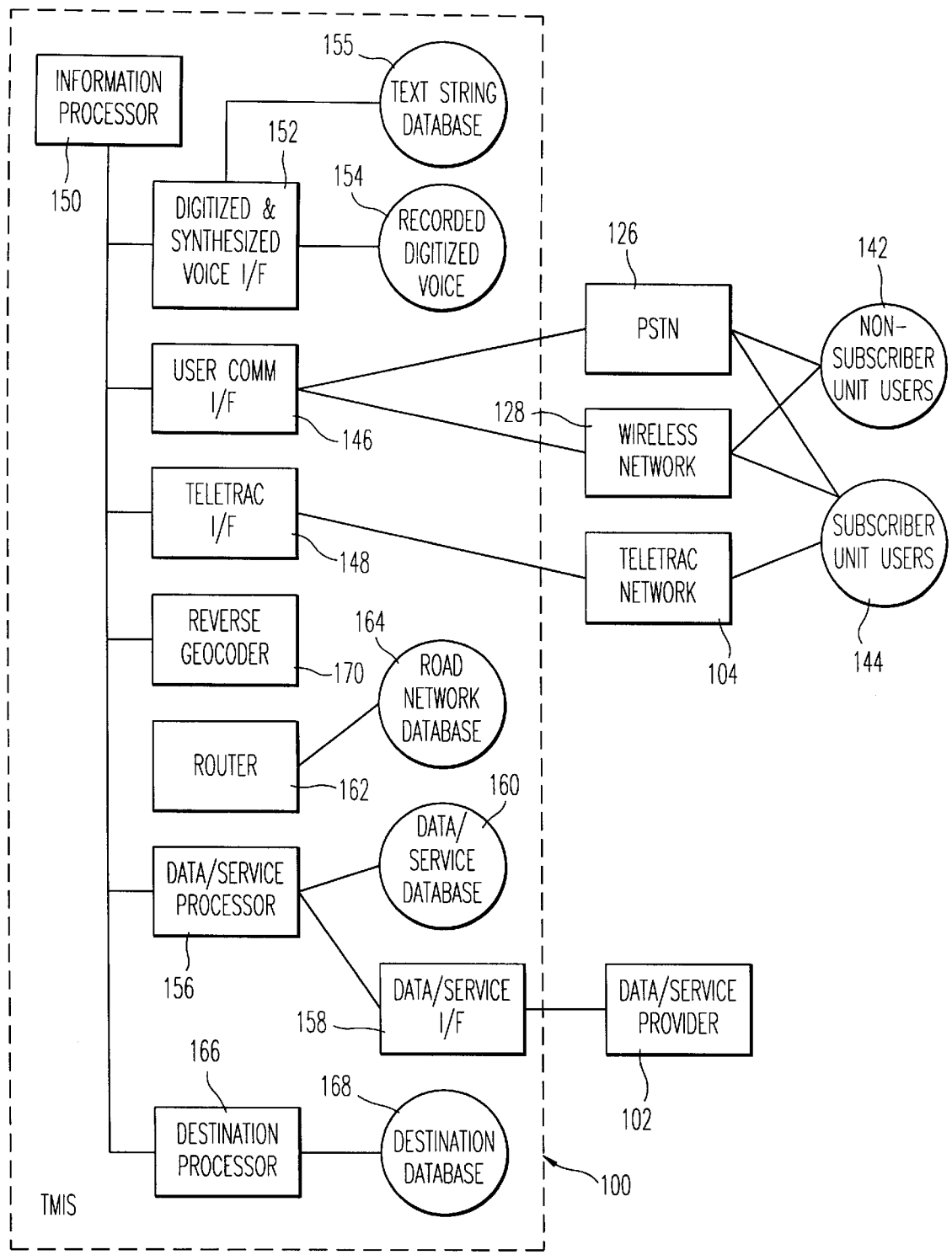
FIG. 2 is a block diagram illustrating the components of the TELETRAC™ Mobile Information Server (TMIS)

One possible embodiment of the system components of the TMIS 100 is shown in FIG. 2. Users are provided access to the TMIS 100 via the PSTN 126, the wireless network 128 and the TELETRAC™ network 104. Non-subscribing users 142 access the TMIS 100 using the PSTN 126 or the wireless network 128. Subscribing users 144 also may access the TMIS 100 using the PSTN 126 or the wireless network 128. In addition, subscribing users 144 may access the TMIS 100 via the TELETRAC™ network 104.

The TMIS 100 interfaces with users via the user communications interface 146 and the TELETRAC™ interface 148. The user communications interface 146 handles the communication function between the user and the TMIS by a combination of hardware, firmware and software. The user communications 146 interface is also cooperatively coupled to the PSTN 126 and the wireless network 128.

The TELETRAC™ interface 148 is coupled to the TELETRAC™ network 104 and implements the two-way messaging protocol between the TMIS 100 and the TELETRAC™ network 104. This includes encoding service requests into message packets to be sent to the TELETRAC™ network 104 and the decoding and parsing of message packets from the TELETRAC™ network 104.

Further, interface with both non-subscribing 142 and subscribing 144 users is facilitated by the use of digitized recorded voice and text to speech synthesized voice. This function is provided by the digitized and synthesized voice interface 152 which is coupled to recorded digitized voice 154 and text string database 155.

The information processor 150 is coupled to the TELETRAC™ interface 148, the user communications interface 146, and the digitized synthesized voice interface 152. The information processor 150 collects user requests, and generates information service messages based on these requests and the location of the subscriber unit 110. The information processor 150 is also coupled to a reverse geocoder 170, a router 162, a data service processor 156 and a destination processor 166.

The reverse geocoder 170 takes a location defined by latitude and longitude which may represent, for example, the current location of the subscribing unit 110, and converts it to the closest street address or street intersection.

The router 162 is coupled to a road network database 164, and computes the "best" route between two points and also generates turn-by-turn instructions. The router 162 uses the road network database 164 which is periodically updated and contains information about the road network, including turn restrictions, road closures, time of day link speeds, and road class.

The data/service processor 156 compiles information from various traffic sources and other data services. The data/service processor 156 also is coupled to a data/service interface 158 and a data/service database 160. The data/service processor 156 maintains the data/service database 160 and fuses data from the data service providers 102.

The data/service processor 156 also characterizes the result in terms of the effect on the road network link speeds. This information can be fed directly to the requesting user, or can be input to the router 162 to adjust link speeds in the computation of a desired route. The data/service processor 156 maintains traffic information for the road network, which is contained in the data/service database 160.

The destination processor 166 coupled to the destination database 168 provide point-of-interest look-up capability and the database search logic to retrieve geocoded (latitude, longitude reference) points that match the user request. These points of interest can be used as the start or destination points for a route.

It is to be understood that the foregoing is a description of one particular embodiment of the invention. Other embodiments are possible which do not depart from the scope of the invention. For example, data fusion may be performed by the information processor 160 or by the data/service provider 102 using the subscriber unit 110 location, without departing from the present invention. Further, other functions performed by the TMIS 100 can be performed by different elements without departing from the scope of the invention.

As shown in Table 1, the user can access the TMIS 100 in a variety of ways. The TMIS can be accessed by both in-vehicle and out-of-vehicle users. While in a vehicle, the user can access the TMIS 100 in the voice mode via a cellular phone 118 or in digital data mode with the use of a personal digital assistant (PDA) device 124, portable computer 120, mobile data terminal 122, cellphone with a transceiver adapter, or integrated Display/Data Entry Device 125.

In the voice mode, the user calls a toll-free number and interacts with a digitized voice menu front end in the TMIS 100 using the cellular phone 118. The requested information is provided to the user in digitized or synthesized voice form.

In digital data mode, the user interface to the TMIS is through a mobile data terminal 122 connected directly to the TELETRAC™ transceiver 112 or by using a PDA 124 or a portable computer 120 with a wireless interface device to access other wireless networks (such as CDPD, cellular, ARDIS, or RAM module).

The user interface is provided via software/firmware running in the PDA 124, portable computer 120, or mobile data terminal 122. Requested information is returned to the user in digital form. When using a mobile data terminal 122 connected to the TELETRAC™ transceiver 112 as the user interface device, all communication (digital) to the TMIS 110 is alternatively provided through the TELETRAC™ network 104, and no other communication network is required.

Access methods to the TMIS 100 outside of a vehicle, for example at home or at a kiosk, are the same as in the vehicle, except the user also has access to a public switched telephone network (PSTN) via a standard phone 130 keypad as well as, or instead of, wireless communication networks such as a cellular telephone network for both voice and digital data access. Furthermore, the user of a TELETRAC™ transceiver 112 outside of the vehicle also contemplates a portable version of the subscriber unit 110.

REQUESTS FROM A MOBILE SUBSCRIBER UNIT

Figure 3:
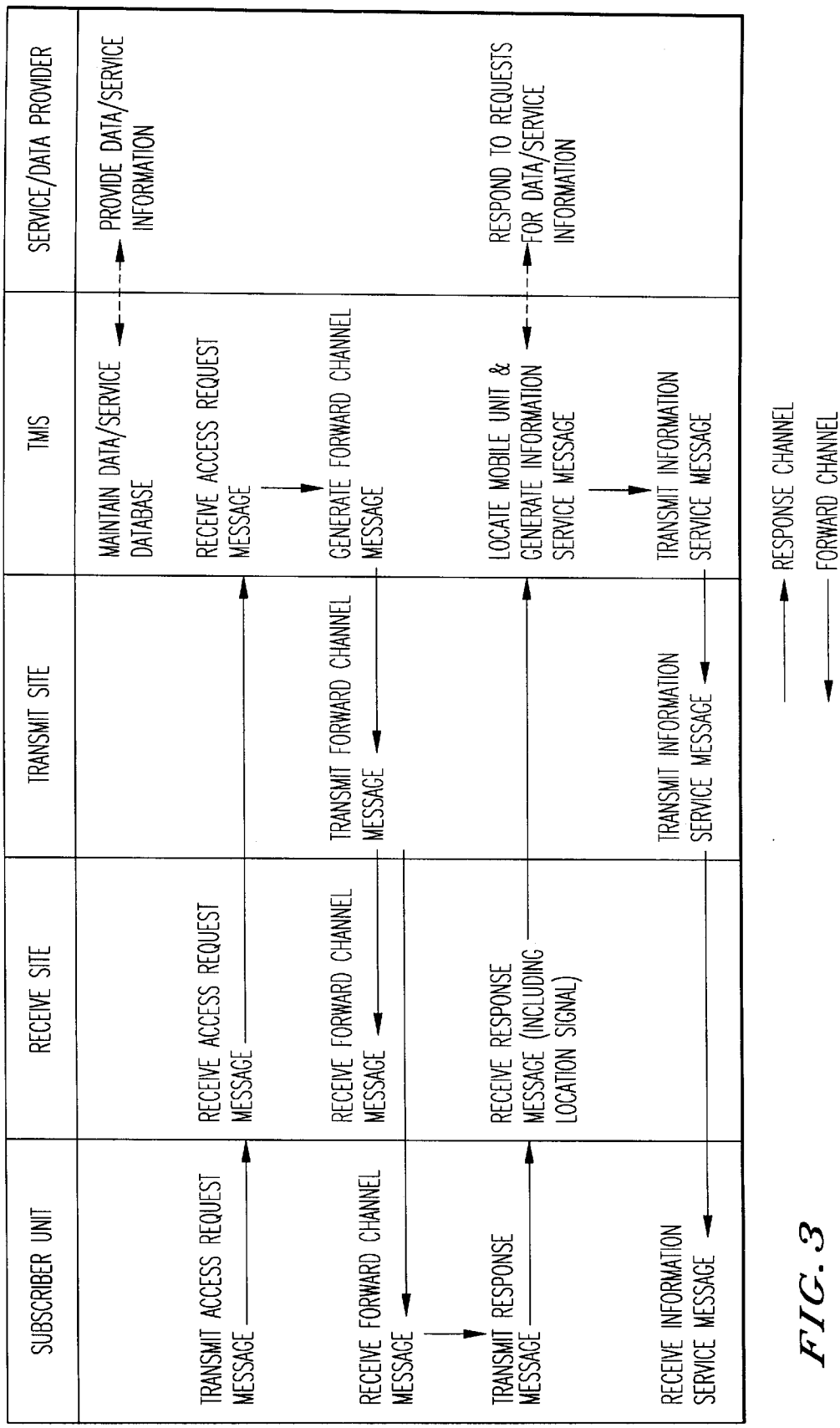
FIG. 3 is a diagram illustrating the operation of the present invention when a subscriber unit requests information services.

FIG. 3 is a diagram illustrating the operation of the present invention when a request for information services originates from the subscriber unit 110. The request is initiated by providing input to the user interface device 114. This request is provided to the TELETRAC™ transceiver 112 which generates an access request message transmitted by the subscriber unit 110 and received by the receive sites 108 of the TELETRAC™ network 104. The access request message comprises an identification number which is unique to the requesting subscriber unit 110. Thereafter, the access request message is provided to the TMIS 100.

The TMIS 100 generates a forward channel message in response to the request message. This forward channel message includes the identification number of the subscriber unit 110 as well as data defining a unique time slot during which the response message from the subscriber unit 110 must be transmitted.

The responding subscriber unit 110 need not include its identification number in the response message, because the desired subscriber unit 110 responds only in the specified time interval for the response message. Since the identification number is at least locally unique, the identification of the responding subscriber unit 110 is determined from the time interval in which the response is received. By eliminating the need for redundant identification, this method allows the information content of the subscriber unit 110 response message to be maximized.

After the TMIS 100 generates the forward channel message, it is provided to a transmit site 106 of the TELETRAC™ network 104. The transmit site transmits this forward channel message to the subscriber unit 110 on a forward channel. The subscriber unit 110 receives the forward channel message and transmits a response message on the response channel in the time slot identified by the forward channel message. This response message includes the information service request from the subscriber unit 110, and a location signal. The information service request is transmitted on the response channel, and the location signal is transmitted on the location channel.

The response message from the subscriber unit 110 is received by at least three receive sites 108 of the TELETRAC™ network 104. The TELETRAC™ network 104 locates the subscriber unit 110 from the time difference of arrival of the response message at the receiving sites 108. The accuracy of the subscriber unit 110 location is increased when the response message is received by four or more receive sites 108. In the preferred embodiment, the time difference of arrival of the response message is computed from four receiving sites 108.

The TMIS 100 uses the subscriber unit location and the information service request to generate an information service message. This is accomplished by accessing a data/service database 160 which may store data from a plurality of data sources 102. The data/service database 160 may include information from traffic reports, Yellow Pages, emergency service providers or other available sources of information. This process involves the requesting and reading of data from the data/service providers 102, and storing the data in the data/service database 160. Further, the data/service database 160 can be updated either on a periodic basis or when the data contained therein has become stale, as determined by the TMIS 100.

This information is processed by the data/service processor 156 to fuse data from the different data sources. The data/service processor 156 is also involved in the generation of the information service message. In doing so, it uses the data in the information service request as well as the subscriber unit 110 position. For example, if the user request is for directions regarding the quickest way to travel from its present location to another location defined by the information service request, the data/service processor 156 uses the subscriber unit 110 location to efficiently access the pertinent data in the data/service database 160. The data/service processor 156 examines and processes these data, accounting for any inconsistencies, and provides the results to the information processor 150. The information processor 150 uses the resulting data to generate the information service message.

Finally, the information service message is transmitted to the subscriber unit 110 via the TELETRAC™ network 104 on the forward channel. This information service message includes both the processed data and the subscriber unit 110 identification number.

In another embodiment, the TMIS 100 also examines the identification number of the requesting subscriber unit 110 and the information service requests and verifies that the requesting user is authorized to access the mobile information services requested. If the subscriber unit 110 is not authorized to access the mobile information services requested, then access is denied, and the TMIS 100 sends an appropriate message to the subscriber unit 110 indicating that access to the requested information is denied.

In yet another embodiment, the TMIS 100 also records the identification number of the requesting subscriber unit 110 and the information service request message to obtain a record for billing the requesting user for the information services provided.

SUBSCRIBER UNIT REQUESTS FOR THE LOCATION OF OTHER SUBSCRIBER UNITS

Figure 4A:
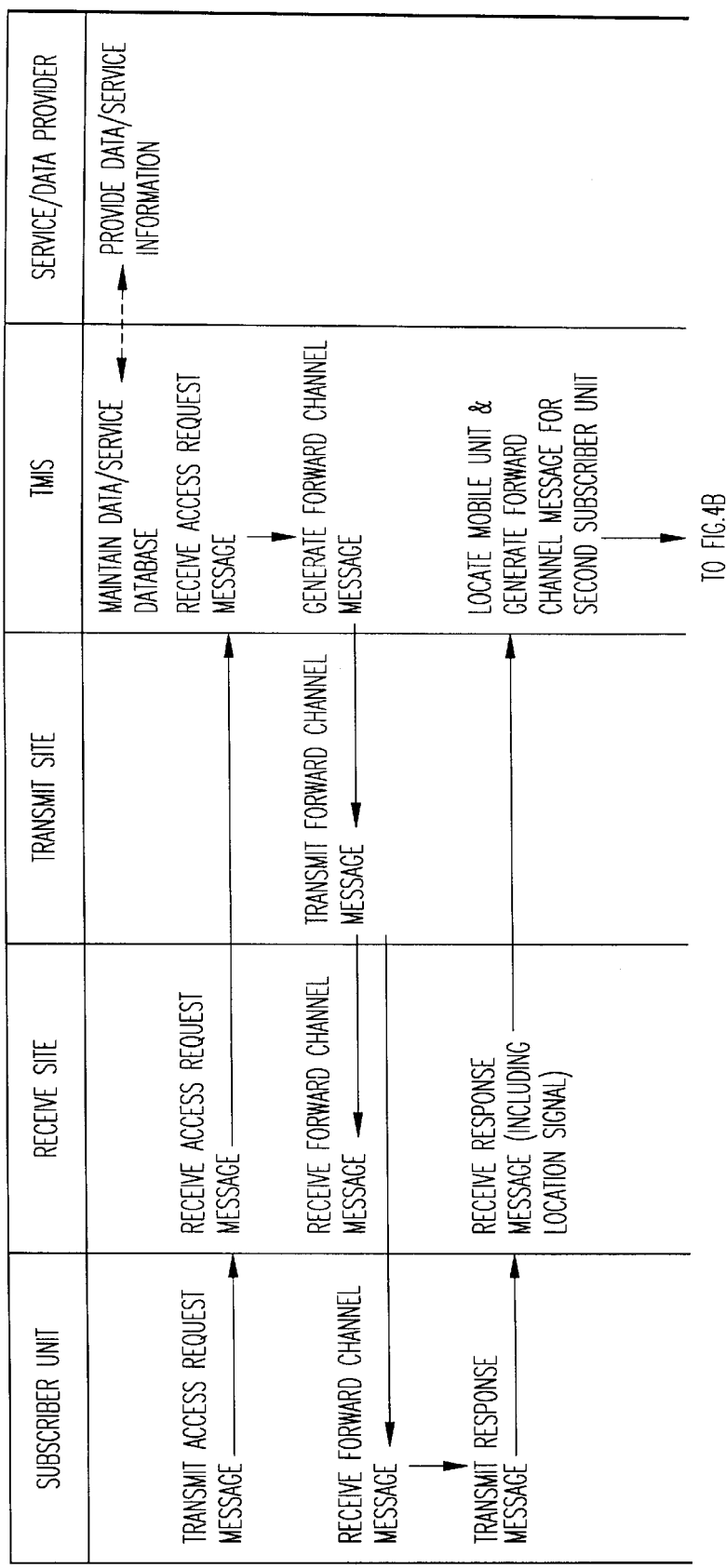
FIG. 4 is a diagram illustrating the operation of the present invention when a subscriber unit requests the location of another subscriber unit or data from a device coupled to the second subscriber unit.
Figure 4B:
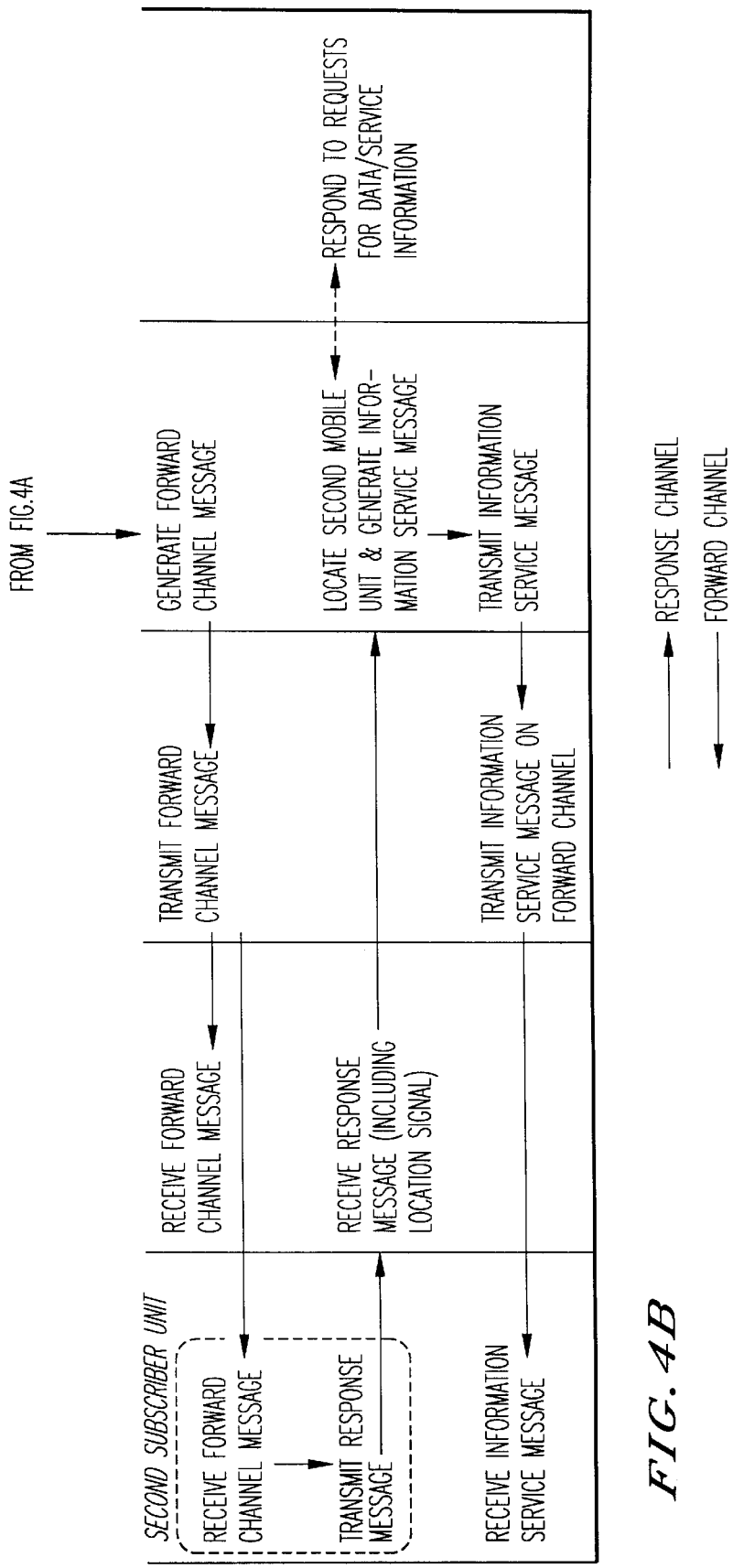

FIG. 4 is a diagram illustrating the operation of the present invention when the request for information services is a request to determine the location of a second subscriber unit 110. In this embodiment, the information service request further comprises an identification number unique to the second subscriber unit 110, so the subject of the request can be identified. Further, the process of generating a response to the information service request includes generating a forward channel message to page the second subscriber unit 110. This forward channel message comprises the identification number of the second subscriber unit as well as data defining a unique time interval for the transmission of the response message from the second subscriber unit 110. The paged second subscriber unit 110 responds by transmitting a response message, which is received by at least three receiving sites 108 of the TELETRAC™ network 104. The location of the second subscriber unit 110 is determined from the time difference of arrival of the location signal from the second subscriber unit 110 at these received sites 108. Thereafter, the TMIS 100 generates an information service message responding to the information service request, using the location of both the requesting subscriber unit 110 and the second subscriber unit 110 as well as the information service request to generate the information service message, as described previously herein. This information service message is then transmitted to the requesting user.

Figure 5A:
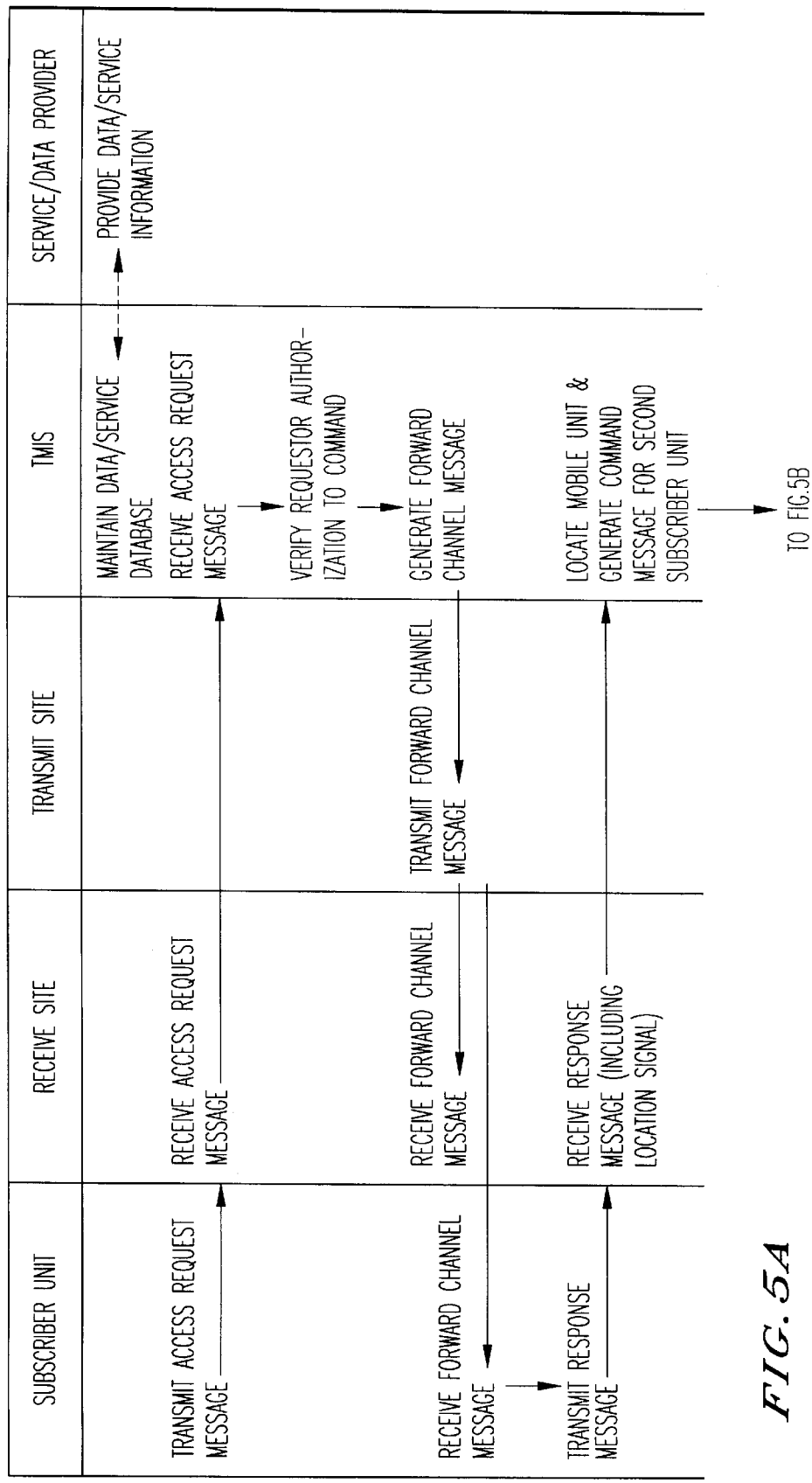
FIG. 5 is a diagram illustrating the operation of the present invention when used to send command messages to a second subscriber unit.
Figure 5B:
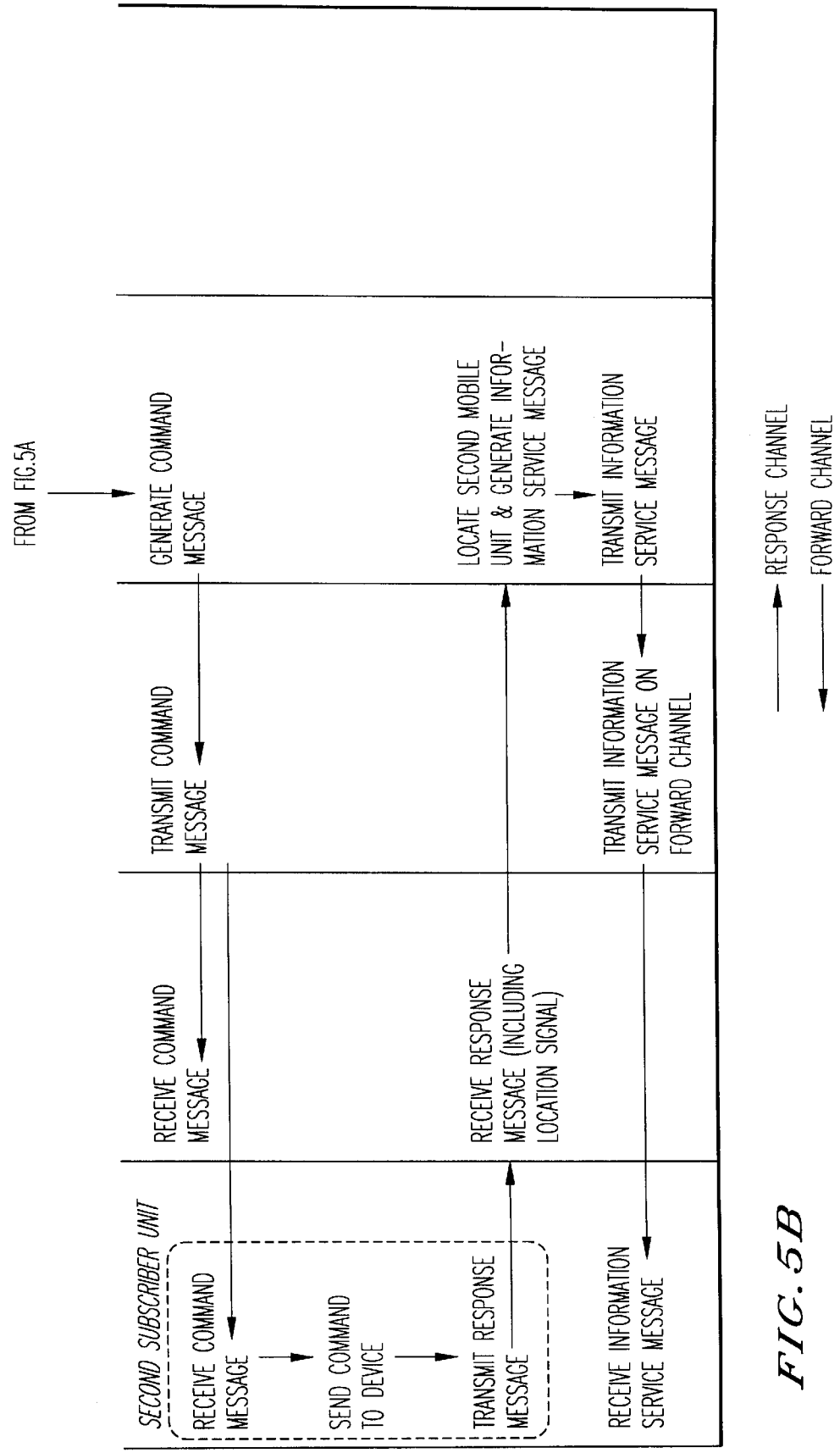

In another embodiment, the requesting subscriber unit 110 may also obtain data from an external device 116 which is coupled to a second subscriber unit 110. This is accomplished in the same way as described above, except the information service request message from the requesting subscriber unit 110 also comprises a request defining the requested data from the external device 116. This device data request is also included in the forward channel message sent from the TMIS 100 to the second subscriber unit 110. Also, using the device data request, the subscriber unit 110 obtains the device data as required, and transmits a response message with this device data to the TMIS 100 via the TELETRAC™ network 104. As shown in FIG. 5, the same method can be employed to provide command messages to the second subscriber unit 110.

REQUESTS FOR SERVICES FROM OTHER THAN A SUBSCRIBER UNIT

Figure 6:
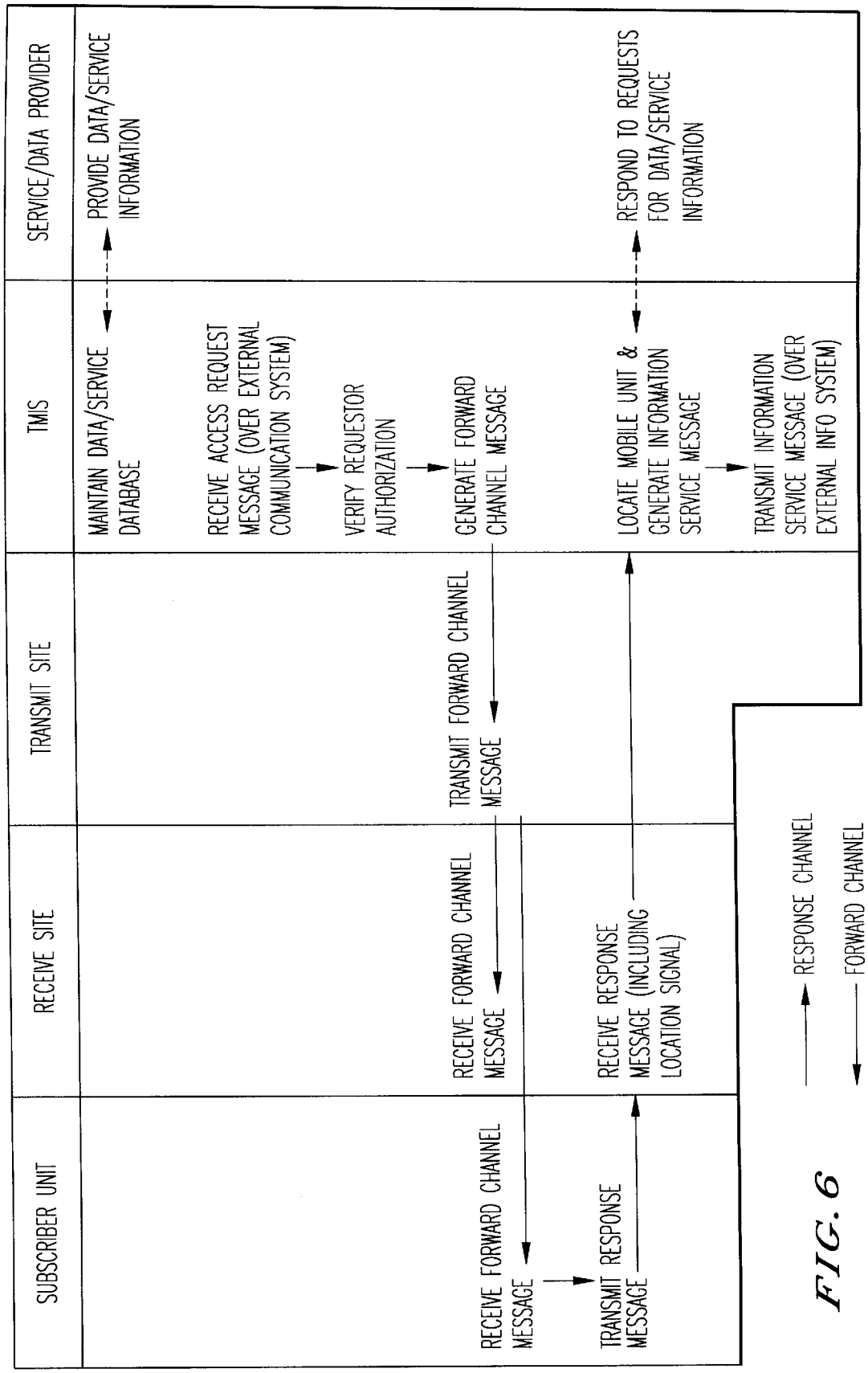
FIG. 6 is a diagram illustrating the operation of the present invention when the access request message is received by and transmitted to an external communications system.

FIG. 6 is a diagram illustrating the operation of the present invention when the request for the location of the subscriber unit 110 is made from a device other than a subscriber unit (non-subscriber unit users) 142. In this case, the non-subscriber unit user 142 has access to the TMIS 100 via the PSTN 126 or the wireless network 128. All of the aspects of the present invention remain unchanged.

Figure 7:
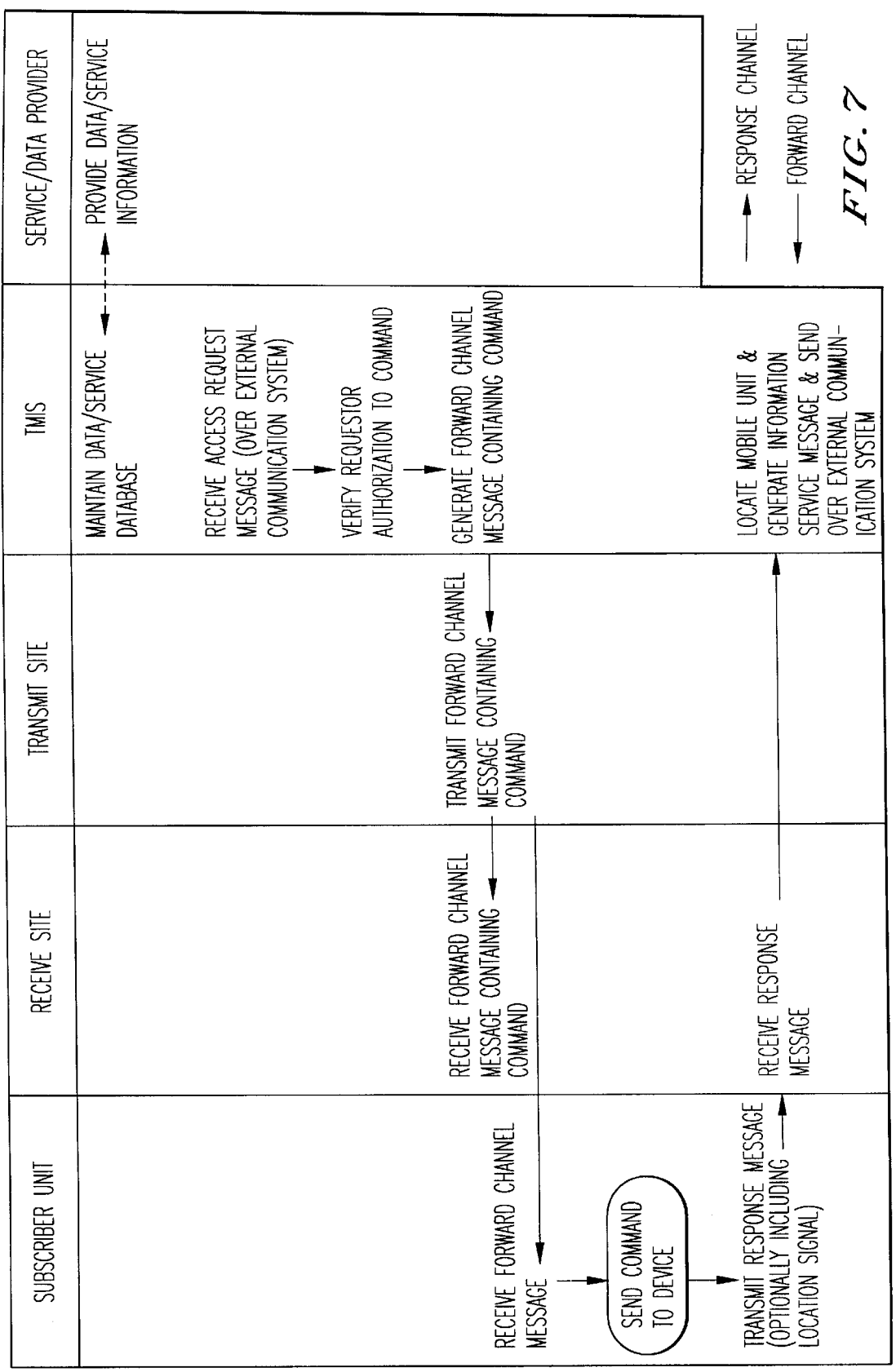
FIG. 7 is a diagram illustrating the operation of the present invention providing command messages to a subscriber unit from an external source.
Figure 8A:
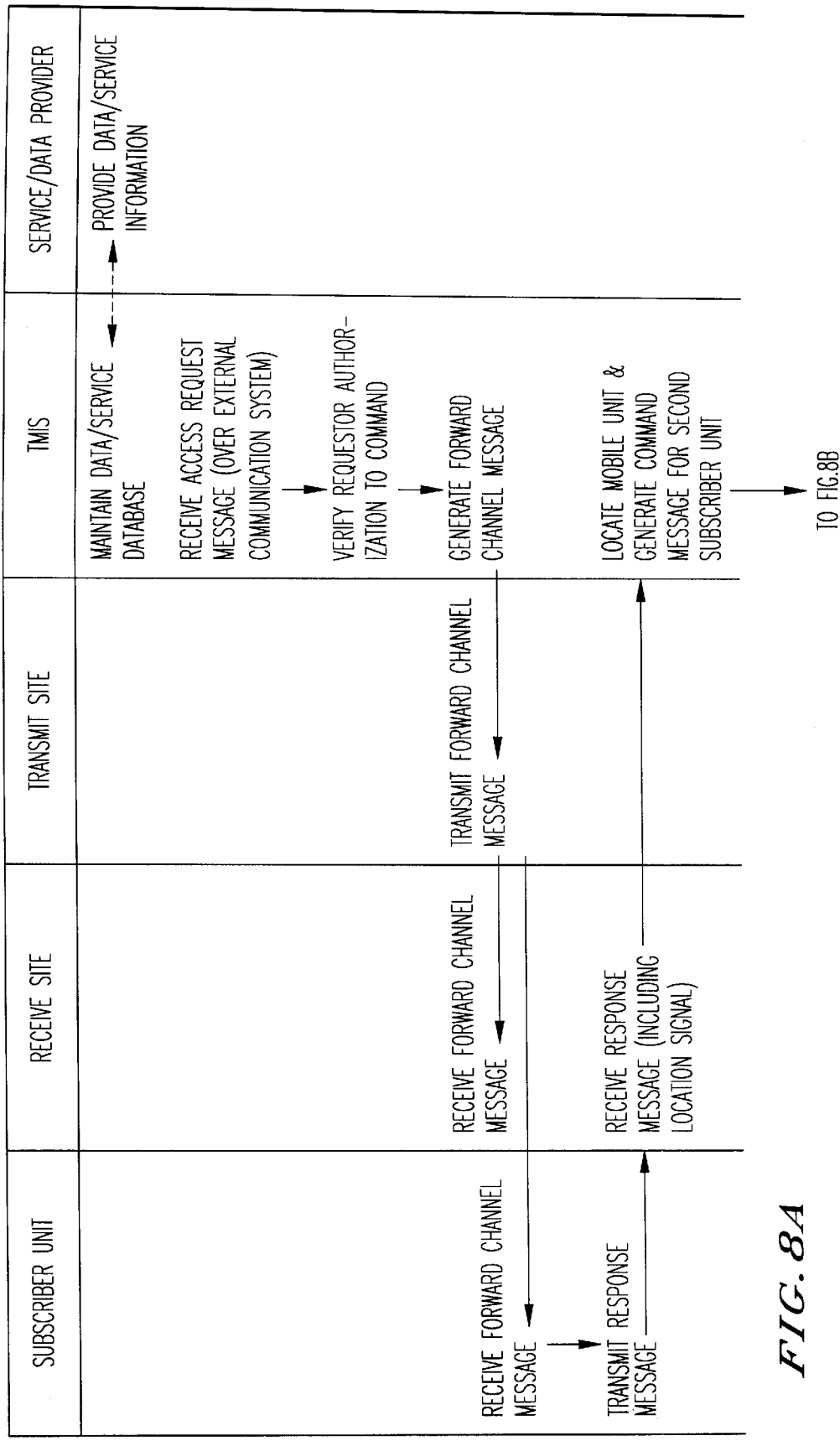
FIG. 8 is a diagram illustrating the operation of the present invention when command messages are sent to a subscriber unit from an external source, and the command message is tailored to the subscriber unit location.
Figure 8B:
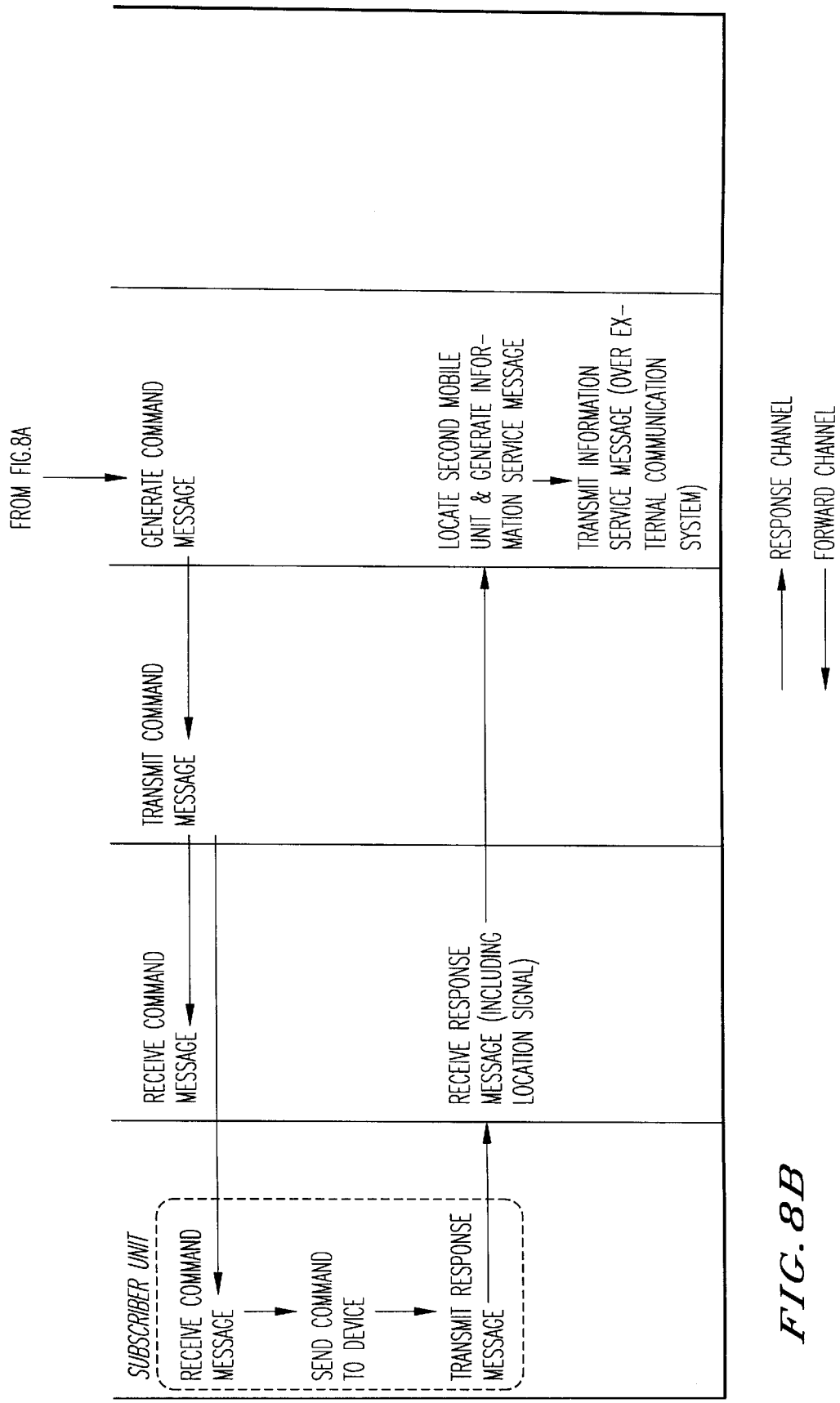

For example, the non-subscriber user 142 can request information regarding the location of a subscriber unit 110 by transmitting a request to the TMIS 100 via an ordinary telephone 130 and the PSTN 126. As shown in FIG. 6, the TMIS 100 responds by generating a forward channel message, which is transmitted by the transmit sites 106 and received by the receive sites 108 and the subscriber unit 110. The subscriber unit 110 replies with the transmission of a response message which includes the location signal. The location of the subscriber unit 110 is determined from the time difference of arrival of the location signal at the receive sites 108. Thereafter, the information service message, which contains the location of the subscriber unit 110, is transmitted to the requesting user 142 via the PSTN 126 and the telephone 130. Similarly, commands can be provided to a second subscriber unit 110 using the same methodology as shown in FIG. 7. This methodology could be used, for example, by a requesting user 142 to unlock the doors of his or her locked automobile. Also, the system may tailor the command based upon the location of the second subscriber unit 110. This methodology is shown in FIG. 8, and could be used, for example, to disable an automobile when its measured location exceeds permissible bounds, providing theft deterrence.

CONCLUSION

This concludes the description of the preferred embodiment to the invention. In summary, the present invention discloses a method and apparatus for providing location-based information to a requesting user. When using a subscriber unit, access to mobile information services is requested by transmitting an access request message with an identification number unique to the subscriber unit from the subscriber unit to receiving sites on a response channel. This access request message is used to generate a forward channel message comprising the identification number of the subscriber unit and data defining a unique time slot for transmission of a response message from the subscriber unit. Thereafter, the subscriber unit is paged by transmitting the forward channel message on a forward channel. The subscriber unit receives the forward channel message and transmits a response message on the response channel in the time interval identified by the forward channel which is received by the receive sites. This response message comprises an information service request from the subscriber unit defining the desired information services and a location signal. The subscriber unit location is determined from the time difference of arrival of the location signal by at least three receiving sites. The information service message is determined in accordance with the user's request by processing and combining data from a plurality of internal and external databases tempered by the location of the subscriber unit. The resulting information service message is transmitted to the subscriber unit on the forward channel. This information service message contains the processed data and the subscriber unit identification number.

The foregoing description of the preferred embodiment of the invention has been presented for purposes of illustration and description. It is not intended to be exhaustive or to limit the invention to the precise form disclosed. Many modifications and variations are possible in light of the above teachings. It is intended that the scope of the invention be limited not by this determined description, but rather by the claims of appended hereto.

TABLE 1

| USER LOCATION | USER INTERFACE DEVICE | USER INTERFACE CONNECTED TO | MOBILE INFORMATION PROVIDED BY | INFORMATION DELIVERY |
|---|---|---|---|---|
| In-Vehicle | Cellular Telephone | N/A | Cellular | Digitized & Synthesized Voice |
| In-Vehicle | PDA/Portable Computer | Wireless Network Interface Device | Wireless Network | Digital Data |
| In-Vehicle | PDA/Portable Computer | Teletrac Transceiver | Teletrac | Digital Data |
| In-Vehicle | Mobile Data Terminal | Teletrac Transceiver | Teletrac | Digital Data |
| In-Vehicle | Cellphone with Transceiver Adapter | Teletrac Transceiver | Teletrac | Digital Data |

TABLE 1-continued

| USER LOCATION | USER INTERFACE DEVICE | USER INTERFACE CONNECTED TO | MOBILE INFORMATION PROVIDED BY | INFORMATION DELIVERY |
| --- | --- | --- | --- | --- |
| In-Vehicle | Integrated Display/Data Entry Device | Teletrac Receiver | Teletrac | Digital Data |
| Out-of-Vehicle | Standard Phone | N/A | PSTN | Digitized & Synthesized Voice |
| Out-of-Vehicle | Cellular | N/A | Wireless Network | Digitized & Synthesized Voice |
| Out-of-Vehicle | PDA/Portable Computer | Standard Modem & Phone | PSTN | Digitized & Synthesized Voice |
| Out-of-Vehicle | PDA/Portable Computer | Wireless Network Interface Device | Wireless Network | Digital Data |
| Out-of-Vehicle | Mobile Data Terminal | Portable Teletrac Transceiver | Teletrac | Digital Data |

What is claimed is:

1. A method of providing location-based information to a requesting user, comprising the steps of:

transmitting an access request message from a subscriber unit to one or more receiving sites on a response channel, the access request message comprising an identification number of the subscriber unit;

transmitting a forward channel message from a transmitting site to the subscriber unit on a forward channel in response to the access request message, the forward channel message comprising an identification number of the subscriber unit and data defining a time interval for transmission of a response message from the subscriber unit;

transmitting a response message comprising an information service request and a location signal to at least three receiving sites in the time interval defined by the forward channel message from the subscriber unit;

locating the subscriber unit from the time difference of arrival of the location signal at the receiving sites;

generating an information service message in response to the information service request and the location of the subscriber unit, the generating step comprising the steps of creating a database request from the information service request and the subscriber unit location, accessing database information using said subscriber unit location to retrieve selected database information responsive to the database request, the selected database information corresponding to at least one of information relating to the current said subscriber unit location and information relating to selected destinations in the vicinity of the current said subscriber unit location, and processing and combining the selected database information to produce an information service message; and transmitting the information service message to the subscriber unit on the forward channel, the information service message comprising the selected database information and the subscriber unit identification number.

2. The method of claim 1, wherein the generating step further comprises the step of verifying that the requesting subscriber unit is authorized to access the requested information.

3. The method of claim 1 wherein the information service request is transmitted on a response channel and the location signal is transmitted on a location channel.

4. A method of providing location-based information to a requesting user, comprising the steps of:

transmitting an access request message from a subscriber unit to one or more receiving sites on a response channel, the access request message comprising an identification number of the subscriber unit;

transmitting a forward channel message from a transmitting site to the subscriber unit on a forward channel in response to the access request message, the forward channel message comprising an identification number of the subscriber unit and data defining a time interval for transmission of a response message from the subscriber unit;

transmitting a response message comprising an information service request and a location signal to at least three receiving sites in the time interval defined by the forward channel message from the subscriber unit;

locating the subscriber unit from the time difference of arrival of the location signal at the receiving sites;

generating an information service message in response to the information service request and the location of the subscriber unit, the generating step comprising the steps of creating a database request from the information service request and the subscriber unit location, receiving database information responsive to the database request, and processing and combining the database information to produce an information service message; and transmitting the information service message to the subscriber unit on the forward channel, the information service message comprising the database information and the subscriber unit identification number;

wherein the information service request comprises an identification number of a second subscriber unit, and the generating step further comprises the steps of transmitting a second forward channel message to the second subscriber unit on the forward channel to page the second subscriber unit in response to the information service request, wherein the second forward channel message comprises an identification number of the second subscriber unit and data defining a time interval for transmission of a response message from the second subscriber unit;

transmitting a second response message comprising a second location signal from the second subscriber unit to at least three receiving sites in response to the forward channel message and in the time interval identified by the second forward channel message; and locating the second subscriber unit from the time difference of arrival of the second location signal from the second subscriber unit at the receiving sites.

5. The method of claim 4 wherein the database request is created from the information service request, the subscriber unit location, and the second subscriber unit location.

6. A method of providing location-based information to a requesting user, comprising the steps of:

transmitting an information service request message from the requesting user to an information server, the information service request message comprising an identification number of a subscriber unit;

transmitting a forward channel message to the subscriber unit on a forward channel in response to the information service request message, the forward channel message comprising an identification number of the subscriber unit and data defining a time interval for transmission of a response message from the subscriber unit;

transmitting a response message comprising an information service request and a location signal to at least three receiving sites in the time interval defined by the forward channel message;

locating the subscriber unit from the time difference of arrival of the response message at the receiving sites;

generating an information service message in response to the information service request and the location of the subscriber unit, the generating step comprising the steps of creating a database request from the information service request and the subscriber unit location, receiving database information responsive to the database request, and processing and combining the database information to produce an information service message; and transmitting the information service message to the requesting user, the information service message comprising the processed data;

wherein the information service request message further comprises a device data request for data from a device coupled to the subscriber unit, and the method further comprises the step of obtaining device data in response to the device data request and wherein the database request is created from the information service request, the subscriber unit location, and the device data.

7. A method of providing commands from a requesting user to at least one device coupled to a commanded subscriber unit, comprising the steps of:

requesting access to the device by transmitting an access request comprising a command request and an identification number of the commanded subscriber unit;

generating a command message in response to the access request, the command message comprising the command request and the commanded subscriber unit identification number;

transmitting the command message to the commanded subscriber unit on a forward channel; and commanding the device by providing the command message from the subscriber unit to the device;

wherein the generating step comprises the steps of generating a forward channel message in response to the access request, the forward channel message comprising an identification number of the commanded subscriber unit and data defining a time interval for transmitting a response message from the commanded subscriber unit;

paging the commanded subscriber unit by transmitting a page message to the commanded subscriber unit on the forward channel;

transmitting a response message comprising a location signal to at least three receiving sites in the time interval defined by the forward channel message;

locating the commanded subscriber unit from the time difference of arrival of the locating signal at the receiving sites; and creating a command message in response to the access request and the commanded subscriber unit location, the command message comprising the command request and the commanded unit identification number.

8. The method of claim 7 wherein the information service request is transmitted on a response channel and the location signal is transmitted on a location channel.

9. A method of providing location-based information to a requesting user, comprising the steps of:

transmitting an information service request message from the requesting user to an information server, the information service request message comprising an identification number of a subscriber unit;

transmitting a forward channel message to the subscriber unit on a forward channel in response to the information service request message, the forward channel message comprising an identification number of the subscriber unit and data defining a time interval for transmission of a response message from the subscriber unit;

transmitting a response message comprising an information service request and a location signal to at least three receiving sites in the time interval defined by the forward channel message;

locating the subscriber unit from the time difference of arrival of the response message at the receiving sites;

generating an information service message in response to the information service request and the location of the subscriber unit, the generating step comprising the steps of creating a database request from the information service request and the subscriber unit location, receiving database information responsive to the database request, and processing and combining the database information to produce an information service message; and transmitting the information service message to the requesting user, the information service message comprising the processed data;

wherein the information service request is transmitted to the information server and the information service message is transmitted to the requesting user via at least one of a Public Switched Telephone Network and a wireless communication system.

10. The method of claim 9 wherein the requesting step comprises the step of transmitting a command request message from the requesting user to an information server, the command request message comprising the identity of the commanded subscriber unit and the command request.

11. The method of claim 10 further comprising the step of verifying that the requesting user is authorized to provide commands to the device.

12. A method of providing commands from a requesting user to at least one device coupled to a commanded subscriber unit, comprising the steps of:

requesting access to the device by transmitting an access request comprising a command request and an identification number of the commanded subscriber unit;

generating a command message in response to the access request, the command message comprising the command request and the commanded subscriber unit identification number;

transmitting the command message to the commanded subscriber unit on a second forward channel; and commanding the device by providing the command message from the subscriber unit to the device;

wherein the requesting step comprises the steps of transmitting an access request message from a requesting subscriber unit to at least one receiving site on a forward channel, the command request message comprising an identification number of the requesting subscriber unit;

generating a forward channel message in response to the request message, the forward channel message comprising an identification number of the requesting subscriber unit and data defining a time interval for transmission of a response message from the requesting subscriber unit;

transmitting a second response message from said requesting subscriber unit during said time interval comprising an identification number and a command request for a commanded subscriber unit; and paging the commanded subscriber unit by transmitting a forwarding channel message to the commanded subscriber unit on the second forward channel, the second forward channel message comprising an identification number of said commanded subscriber unit and data defining a second time interval for transmission of a response message from the commanded subscriber unit;

and the generating step comprises the step of transmitting a response message on the response channel in the second time interval identified by the second forward channel message, the second response message comprising a command request and an identification number of the commanded subscriber unit.

13. The method of claim 12 further comprising the step of verifying that the requesting user is authorized to provide commands to the device.

14. A method of providing location-based information to a requesting user, comprising the steps of:

transmitting an access request message from a subscriber unit to one or more receiving sites on a response channel, the access request message comprising an identification number of the subscriber unit;

transmitting a forward channel message from a transmitting site to the subscriber unit on a forward channel in response to the access request message, the forward channel message comprising an identification number of the subscriber unit and data defining a time interval for transmission of a response message from the subscriber unit;

transmitting a response message comprising an information service request and a location signal to at least three receiving sites in the time interval defined by the forward channel message from the subscriber unit;

locating the subscriber unit from the time difference of arrival of the location signal at the receiving sites;

generating an information service message in response to the information service request and the location of the subscriber unit, the generating step comprising the steps of creating a database request from the information service request and the subscriber unit location, receiving database information responsive to the database request, and processing and combining the database information to produce an information service message; and transmitting the information service message to the subscriber unit on the forward channel, the information service message comprising the database information and the subscriber unit identification number;

wherein the information service request further comprises an identification number of a second subscriber unit coupled to a device and a device data request.

15. The method of claim 14 wherein the generating step further comprises the steps of:

transmitting a second forward channel message to the second subscriber unit on a forward channel to page the second subscriber unit in response to the information service request, wherein the second forward channel message comprises the identification number of the second subscriber unit, data defining a time interval for transmission of a response message from the second subscriber unit, and the device data request;

obtaining the device data in response to the device data request;

transmitting a second response message on the forward channel from the second subscriber unit to at least three receiving sites in response to the second forward channel message and in the time interval identified by the second forward channel message, the response message comprising the device data and a second location signal; and locating the second subscriber unit from the time difference of arrival of the second location signal from the second subscriber unit at the receiving sites.

16. The method of claim 15 wherein the database request is created from the information service request, the subscriber unit location, and the second subscriber unit location.

17. The method of claim 16 wherein the database request is created from the device data.

* * * * *